(12) United States Patent
Smith (10) Patent No.: US 9,607,140 B2
(45) Date of Patent: *Mar. 28, 2017

(54) AUTHENTICATING A USER OF A SYSTEM VIA AN AUTHENTICATION IMAGE MECHANISM

(71) Applicant: Intel Corporation, Santa Clara, CA (US)

(72) Inventor: Ned M. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/629,646

(22) Filed: Feb. 24, 2015

(65) Prior Publication Data

US 2015/0169862 A1 Jun. 18, 2015

Related U.S. Application Data

(63) Continuation of application No. 13/531,878, filed on Jun. 25, 2012, now Pat. No. 8,973,095.

(51) Int. Cl.
*G06F 21/00* (2013.01)
*G06F 21/36* (2013.01)
*G06F 21/30* (2013.01)
*G06F 21/31* (2013.01)

(52) U.S. Cl.
CPC .................................. *G06F 21/36* (2013.01)

(58) Field of Classification Search
CPC .......... G06F 21/00; G06F 21/30; G06F 21/31; H04L 63/0823; G11B 20/0021
USPC .................. 380/200–270; 709/217–227; 713/150–189; 726/2, 26–28
See application file for complete search history.

(56) References Cited

U.S. PATENT DOCUMENTS

| | | | |
|---|---|---|---|
| 6,421,453 B1 | 7/2002 | Kanevsky et al. | |
| 6,735,695 B1* | 5/2004 | Gopalakrishnan | G06F 21/32 713/186 |
| 8,433,214 B2* | 4/2013 | Oak | G03G 15/5091 399/76 |
| 2005/0084233 A1* | 4/2005 | Fujii | H04N 7/0125 386/232 |

(Continued)

FOREIGN PATENT DOCUMENTS

| | | |
|---|---|---|
| AU | 2011202415 | 4/2012 |
| CN | 101840469 | 9/2010 |

(Continued)

OTHER PUBLICATIONS

European Patent Office, Extended European Search Report mailed Feb. 2, 2016 in European Patent Application No. 13809751.4.

(Continued)

*Primary Examiner* — Tae Kim
*Assistant Examiner* — Shiuh-Huei Ku
(74) *Attorney, Agent, or Firm* — Trop, Pruner & Hu, P.C.

(57) ABSTRACT

In an embodiment, the present invention includes a method for receiving a request for user authentication of a system, displaying an authentication image on a display of the system using a set of random coordinates, receiving a plurality of gesture input values from the user, and determining whether to authenticate the user based at least in part on the plurality of gesture input values. Other embodiments are described and claimed.

20 Claims, 6 Drawing Sheets

(56) References Cited

U.S. PATENT DOCUMENTS

| | | |
|---|---|---|
| 2006/0015717 A1 | 1/2006 | Liu et al. |
| 2006/0143467 A1* | 6/2006 | Kubo .................... G06F 3/0488 |
| | | 713/183 |
| 2006/0206717 A1 | 9/2006 | Holt et al. |
| 2006/0206918 A1 | 9/2006 | McLean |
| 2008/0126779 A1 | 5/2008 | Smith |
| 2008/0244292 A1 | 10/2008 | Kumar et al. |
| 2009/0089588 A1 | 4/2009 | Adrangi et al. |
| 2009/0132837 A1 | 5/2009 | Kumar |
| 2009/0172438 A1 | 7/2009 | Kumar |
| 2010/0082987 A1 | 4/2010 | Thom et al. |
| 2010/0169640 A1 | 7/2010 | Smith et al. |
| 2010/0169666 A1 | 7/2010 | Dewan et al. |
| 2011/0145598 A1 | 6/2011 | Smith |
| 2012/0030730 A1 | 2/2012 | Smith et al. |
| 2012/0054833 A1 | 3/2012 | Albisu |
| 2012/0159608 A1* | 6/2012 | Griffin ..................... G09C 5/00 |
| | | 726/16 |
| 2012/0260220 A1 | 10/2012 | Griffin |
| 2013/0014248 A1 | 1/2013 | McLaughlin et al. |
| 2013/0145443 A1* | 6/2013 | McLaughlin ......... H04L 63/083 |
| | | 726/5 |

FOREIGN PATENT DOCUMENTS

| | | |
|---|---|---|
| EP | 2194476 | 6/2010 |
| EP | 2204758 | 7/2010 |

OTHER PUBLICATIONS

Intel, "Intel® Trusted Execution Technology (Intel® TXT), Software Development Guide, Measured Launched Environment Developer's Guide," Mar. 2011, 112 pages.

Intel, "Trusted Execution Technology Architectural Overview," 2003, 8 pages.

Intel, White Paper, "Trusted Execution Technology, Hardware-based Technology for Enhancing Server Platform Security," 2010, 8 pages.

International Searching Authority, "Notification of Transmittal of the International Search Report and the Written Opinion of the International Searching Authority," mailed Oct. 16, 2013, in International application No. PCT/US2013/045545.

International Patent Application No. PCT/US11/67573 filed Dec. 28, 2011, entitled "Method and Apparatus to Determined User Presence," by Victoria C. Moore.

China State Intellectual Property Office, First Office Action mailed May 20, 2016 in Chinese Patent Application No. 201380027320.X.

State Intellectual Property Office of the People's Republic of China, Office Action mailed Jan. 19, 2017 in Chinese Patent Application No. 201380027350.X.

* cited by examiner

AUTHENTICATING A USER OF A SYSTEM VIA AN AUTHENTICATION IMAGE MECHANISM

This application is a continuation of U.S. patent application Ser. No. 13/531,878, filed Jun. 25, 2012, the content of which is hereby incorporated by reference.

TECHNICAL FIELD

Embodiments relate to authentication procedures for a computer system.

BACKGROUND

Modern computing platforms of different varieties such as tablets, smartphones, and Ultrabooks™, among others are provided with touch panel displays. In addition, desktop and notebook systems are also being offered with these displays.

Either using a touch panel display or other available displays, some operating system (OS) vendors and independent software vendors (ISVs) have introduced an alternative to passwords using a picture as a method for performing user authentication. The user recalls several points and/or sequence of points on the display. An image on the display provides the user with reference points from which to remember the authentication points. This form of authentication can be used with non-touch displays as well using a touch pad, mouse or joystick to control the touch focus during the authentication challenge.

One problem for picture-based authentication is that an input path (whether by touch panel, touch pad, mouse or otherwise) is subject to man-in-the-box attacks, where malware can log the user input and easily replay it to the OS or disclose it to another person who then can impersonate the legitimate user.

DETAILED DESCRIPTION

In various embodiments, a user authentication mechanism may be provided within a computer system to enable a user to be authenticated to all or a portion of the system based on one or more input gestures provided by the user that are associated with an authentication image within a larger display image. More specifically, this authentication image may be located at a random location within this larger display image, where this random location varies for each authorization challenge to the system. Furthermore, the display frame image including the authentication image may be provided to a display via a trusted channel such that the true location of the authentication image within the larger display frame image cannot be ascertained by untrusted agents of the system.

Figure 1:
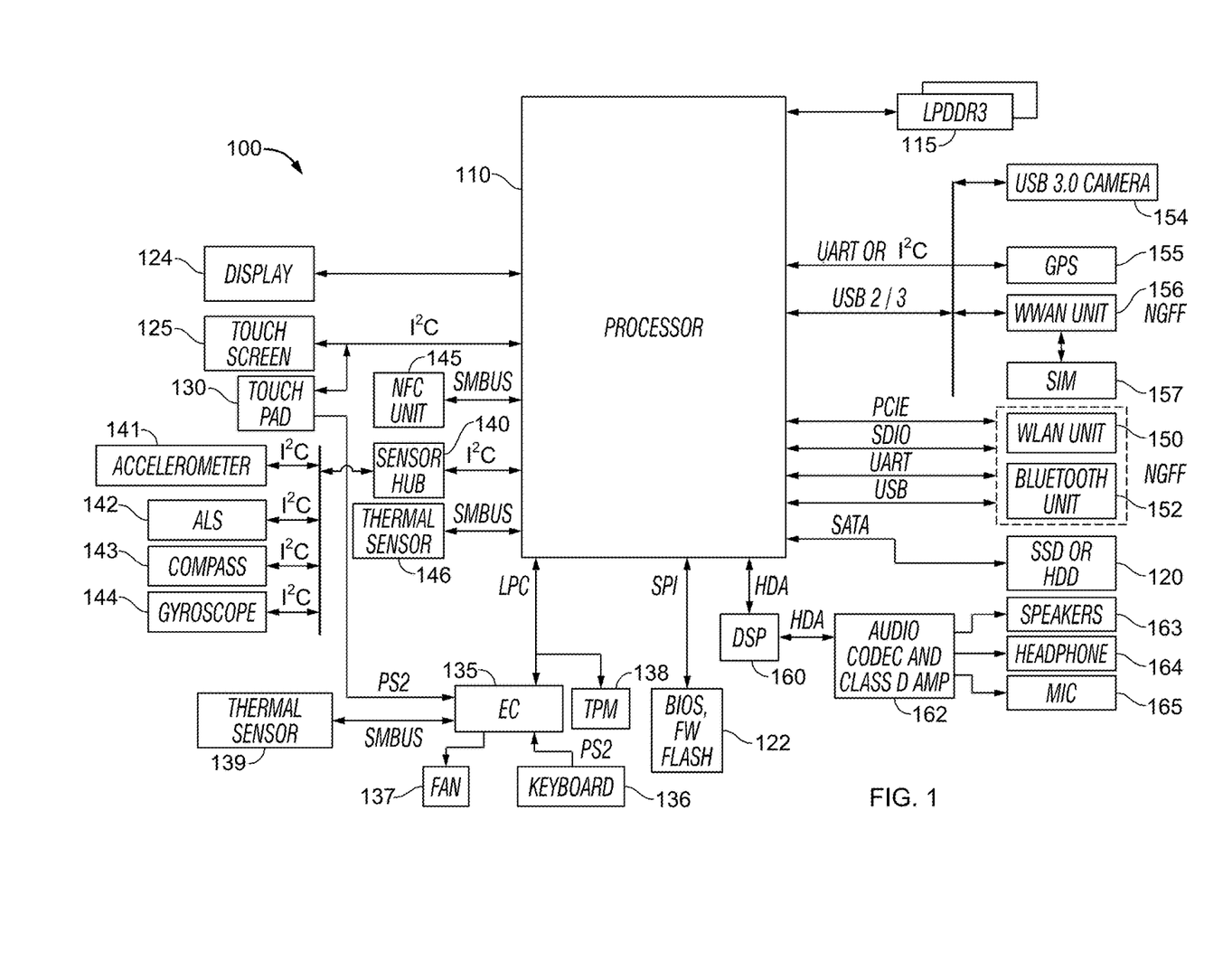
FIG. 1 is a block diagram of components present in a computer system in accordance with an embodiment of the present invention.

Referring now to FIG. 1, shown is a block diagram of components present in a computer system in accordance with an embodiment of the present invention. As shown in FIG. 1, system 100 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 1 is intended to show a high level view of many components of the computer system. However, it is to be understood that additional components may be present in certain implementations and furthermore, different arrangement of the components shown may occur in other implementations.

As seen in FIG. 1, a processor 110, which may be a low power multicore processor socket such as an ultra low voltage processor, may act as a main processing unit and central hub for communication with the various components of the system. Such processor can be implemented as a system on a chip (SoC). In one embodiment, processor 110 may be an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 processor. Certain details regarding the architecture and operation of processor 110 in one implementation will be discussed further below.

Processor 110 may communicate with a system memory 115, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 110 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

To provide for persistent storage of information such as data, applications, one or more operating systems and so forth, a mass storage 120 may also couple to processor 110. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 1, a flash device 122 may be coupled to processor 110, e.g., via a serial peripheral interface (SPI). This flash device may provide for non-volatile storage of system software, including a basic input/output software (BIOS) as well as other firmware of the system.

Various input/output (IO) devices may be present within system 100. Specifically shown in the embodiment of FIG. 1 is a display 124 which may be a high definition LCD or LED panel configured within a lid portion of the chassis. This display panel may also provide for a touch screen 125, e.g., adapted externally over the display panel such that via a user's interaction with this touch screen, user inputs can be provided to the system to enable desired operations, e.g., with regard to the display of information, accessing of information and so forth. In one embodiment, display 124 may be coupled to processor 110 via a display interconnect that can be implemented as a high performance graphics interconnect. Touch screen 125 may be coupled to processor 110 via another interconnect, which in an embodiment can be an $I^2C$ interconnect. As further shown in FIG. 1, in addition to touch screen 125, user input by way of touch can also occur via a touch pad 130 which may be configured within the chassis and may also be coupled to the same $I^2C$ interconnect as touch screen 125. Such user input devices can be used for authentication purposes as described herein.

For perceptual computing and other purposes, various sensors may be present within the system and can be coupled to processor 110 in different manners. Certain inertial and environmental sensors may couple to processor 110 through a sensor hub 140, e.g., via an $I^2C$ interconnect. In the embodiment shown in FIG. 1, these sensors may include an accelerometer 141, an ambient light sensor (ALS) 142, a compass 143 and a gyroscope 144. Other environmental sensors may include one or more thermal sensors 146 which may couple to processor 110 via a system management bus (SMBus) bus, in one embodiment.

Also seen in FIG. 1, various peripheral devices may couple to processor 110 via a low pin count (LPC) interconnect. In the embodiment shown, various components can be coupled through an embedded controller 135. Such components can include a keyboard 136 (e.g., coupled via a PS2 interface), a fan 137, and a thermal sensor 139. In some embodiments, touch pad 130 may also couple to EC 135 via a PS2 interface. In addition, a security processor such as a trusted platform module (TPM) 138 in accordance with the Trusted Computing Group (TCG) TPM Specification Version 1.2, dated Oct. 2, 2003, may also couple to processor 110 via this LPC interconnect. Note that the TPM may also be integrated into a security co-processor such as a converged security engine (CSE), SoC security engine or a processor security zone such as a "TrustZone" or a secure enclave.

System 100 can communicate with external devices in a variety of manners, including wirelessly. In the embodiment shown in FIG. 1, various wireless modules, each of which can correspond to a radio configured for a particular wireless communication protocol, are present. One manner for wireless communication in a short range such as a near field may be via a near field communication (NFC) unit 145 which may communicate, in one embodiment with processor 110 via an SMBus. Note that via this NFC unit 145, devices in close proximity to each other can communicate. For example, a user can enable system 100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 1, additional wireless units can include other short range wireless engines including a wireless local area network (WLAN) unit 150 and a Bluetooth unit 152. Using WLAN unit 150, Wi-Fi™ communications in accordance with a given Institute of Electrical and Electronics Engineers (IEEE) 802.11 standard can be realized, while via Bluetooth unit 152, short range communications via a Bluetooth protocol can occur. These units may communicate with processor 110 via, e.g., a USB link or a universal asynchronous receiver transmitter (UART) link. Or these units may couple to processor 110 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of next generation form factor (NGFF) connectors adapted to a motherboard.

In addition, wireless wide area network (WLAN) communications, e.g., according to a cellular or other wireless wide area protocol, can occur via a WWAN unit 156 which in turn may couple to a subscriber identity module (SIM) 157. In addition, to enable receipt and use of location information, a global positioning system (GPS) module 155 may also be present. Note that in the embodiment shown in FIG. 1, WWAN unit 156 and an integrated capture device such as a camera module 154 may communicate via a given USB protocol such as a USB 2.0 or 3.0 link, or a UART or $I^2C$ protocol. Again the actual physical connection of these units can be via adaptation of a NGFF add-in card to an NGFF connector configured on the motherboard.

To provide for audio inputs and outputs, an audio processor can be implemented via a digital signal processor (DSP) 160, which may couple to processor 110 via a high definition audio (HDA) link. Similarly, DSP 160 may communicate with an integrated coder/decoder (CODEC) and amplifier 162 that in turn may couple to output speakers 163 which may be implemented within the chassis. Similarly, amplifier and CODEC 162 can be coupled to receive audio inputs from a microphone 165 which in an embodiment can be implemented via dual array microphones to provide for high quality audio inputs to enable voice-activated control of various operations within the system. Note also that audio outputs can be provided from amplifier/CODEC 162 to a headphone jack 164. Although shown with these particular components in the embodiment of FIG. 1, understand the scope of the present invention is not limited in this regard.

Figure 2:
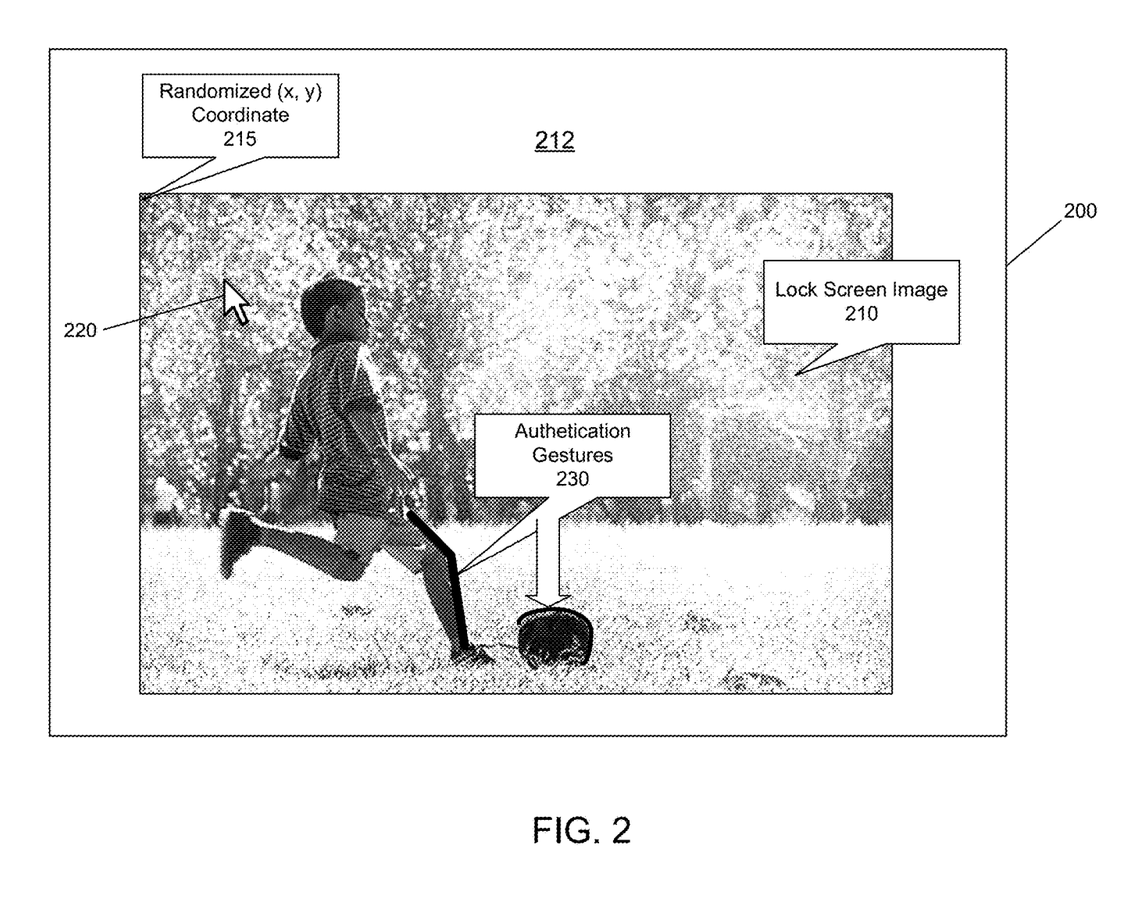
FIG. 2 is an illustration of a display frame image in accordance with an embodiment of the present invention.

Referring now FIG. 2, shown is an illustration of a display frame image in accordance with an embodiment of the present invention. As shown in FIG. 2, display frame image 200 may be an image shown on a display of a given platform. As seen, this display frame image includes a background portion 212 and an authentication image 210, also referred to herein as a lock screen image. In various embodiments, this display frame image, while viewable by a user of the platform, cannot be accessed by untrusted software including an OS and applications (potentially including a malware application) executing on the platform. Furthermore, understand that the display frame image may be provided to the display via a secure channel from an engine on which it is generated such that the display frame image (including the authentication image) cannot be accessed or otherwise obtained by an untrusted agent (e.g., corresponding to untrusted system software or other software, as well as untrusted components of the system). In one embodiment, the display frame image may be generated using a trusted display technology. In this way, the host software and OS are not able to decipher the contents of that frame, and instead it is provided via a trusted output path from the trusted engine to an (e.g., integrated) graphics display processor.

As seen, authentication image 210 may be smaller than display frame image 200. And, in various embodiments protection can be strengthened by making the authentication image as small as possible, within the ability of a user to provide inputs of gestures associated with this image.

As seen in FIG. 2, authentication image 210 may be anchored or pinned to a set of randomized coordinates corresponding to an anchor position 215 at a randomized set of X, Y coordinates. As such, every time an authentication image is displayed, it can be located at a different, randomized location within a display frame image. As a result, any user authentication inputs that are improperly obtained cannot be used for a subsequent attack on the system.

As seen, one or more authentication gestures 230 may be entered by a user. To this end, a gesture input focus 220, such as a cursor in the case of user input by way of mouse or touchpad (or via touchscreen) can be provided to indicate to a user a location to which the user is pointing. Although shown at this high level in the embodiment of FIG. 2, understand the scope of the present invention is not limited in this regard.

Figure 3:
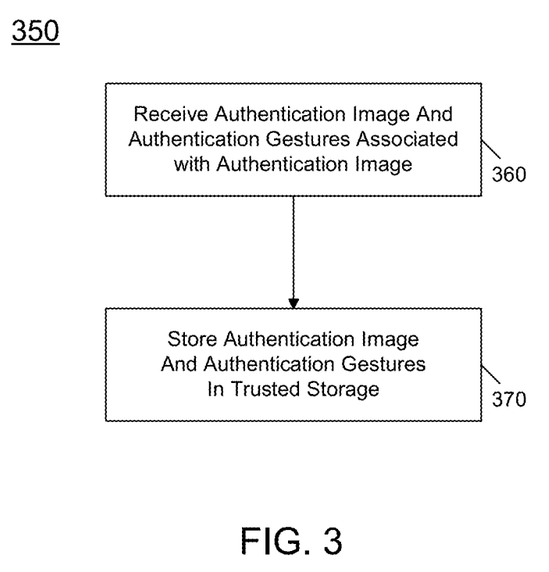
FIG. 3 is a flow diagram of a provisioning method in accordance with an embodiment of the present invention.

Referring now to FIG. 3, shown is a flow diagram of a provisioning method in accordance with an embodiment of the present invention. As shown in FIG. 3, method 350 can be implemented, e.g., by security hardware of a system. For example, a security processor such as a manageability engine (ME) of a system may be implemented within a chipset, processor or SoC, in some embodiments. As seen, method 350 can begin by receiving an authentication image and authentication gestures associated with the authentication image (block 360). Note that this authentication image can be provisioned from a remote server, e.g., via a secure channel. Other available authentication images may be present within a system and can be stored in a trusted storage, e.g., by the user. Such image may be a user-provided image, in some embodiments. Note that this authentication image can in many embodiments be implemented as a bitmap.

Along with this authentication image, the user may provide authentication gestures, which can be a single user selection, e.g., touch or mouse click on a specific location within the authentication image. In more typical embodiments, the authentication gestures may be a plurality of gestures, e.g., multiple touch points, sequences of gestures such as swipes or selections of different locations/features within the authentication image. Each swipe sequence may be formed of multiple touchpoints. As an example, a first sequence may call for two touch points, a second sequence may call for three touch points, and a third sequence may call for four touch points. In an embodiment, the provisioning process may be performed with the authentication image presented at an unrandomized set of X, Y coordinates (e.g., originating with the top left most portion of the authentication image at the top left most portion of the display frame).

As further seen in FIG. 3, both the authentication image and the authentication gestures may be stored in a trusted storage (block 370). For example, in an embodiment this data can be stored in a protected non-volatile storage of ME or another trusted storage. Although shown at this high level in the embodiment of FIG. 3, understand the scope of the present invention is not limited in this regard.

Figure 4:
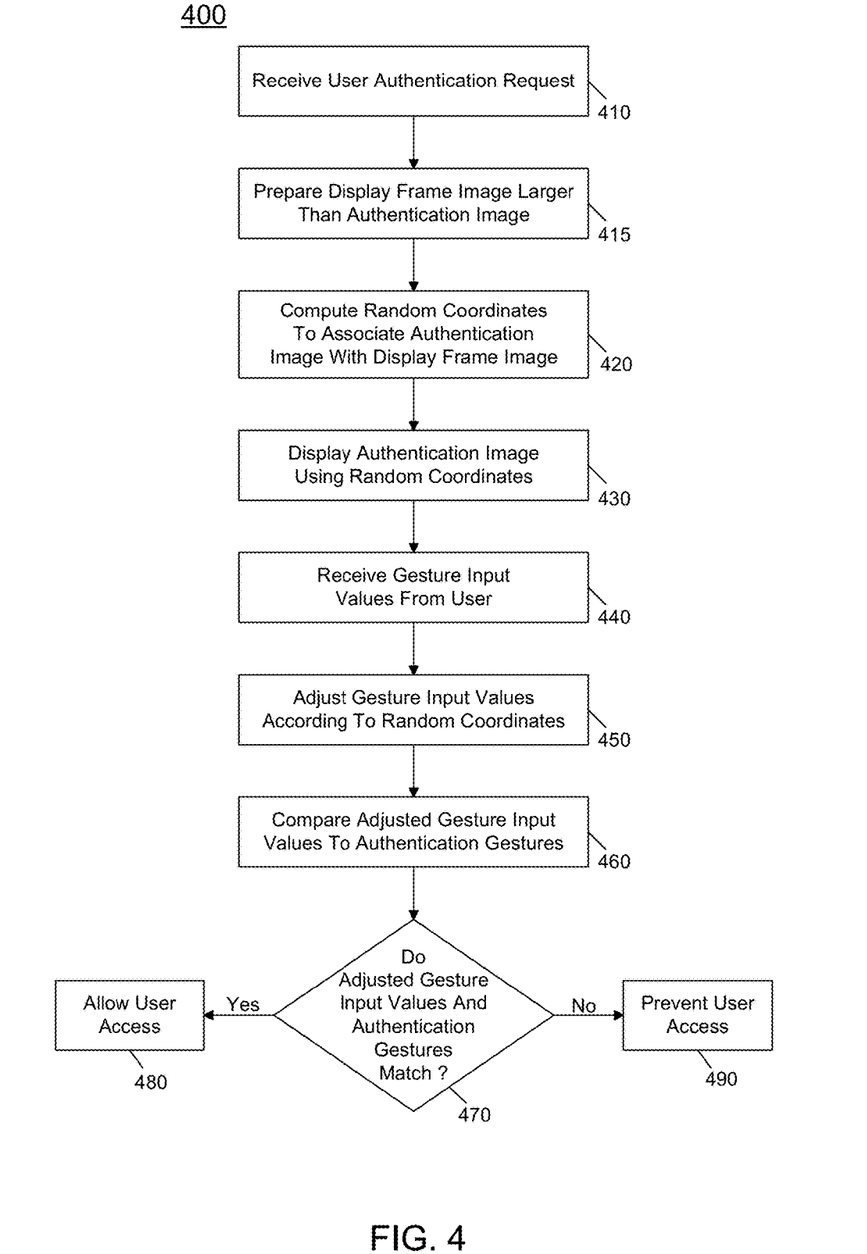
FIG. 4 is a flow diagram for an authentication method in accordance with one embodiment of the present invention.

FIG. 4 is a flow diagram for an authentication method in accordance with one embodiment of the present invention. As seen in FIG. 4, method 400 can be performed at least in part using security hardware such as described above. Method 400 begins by receiving a user authentication request (block 410). This request can be received from a user seeking access to a system (e.g., on power up of the system or after powering up from a sleep state). Responsive to this trigger, the ME prepares a challenge for the user to authenticate.

More specifically in the embodiment of FIG. 4, a display frame image can be prepared (block 415). This display frame image may be generated in the ME or other secure processor and provided to a display via a secure, trusted channel such that it is not visible to untrusted software, including OS and application software. In some embodiments, this display frame image can be as large as an entire display panel size, however the scope of the present invention is not limited in this regard. As seen with reference back to FIG. 2, the background portion of the display frame image can be of a monochromatic image or a randomized pattern. In an embodiment, an authorization session may be performed with an encrypted channel to a service provider that provisions the authentication image. A user can have multiple images stored on the server and the server may randomly choose the images to provide. In this way at any given login attempt, the user could be presented with a different set of one or more display images for authentication purposes.

Still referring to FIG. 4, next at block 420 random coordinates may be computed. More specifically, these random coordinates can be a set of X, Y coordinates that identify a location within the display frame image at which an authentication image is to be displayed. For example, assume that a given display panel and the corresponding display drivers are set up such that the top left most pixel of the display corresponds to an X-Y set of [0, 0]. The random set of coordinates may be offset from this initial position by a random amount in both the X and Y directions. The random coordinates may thus be used as an anchor location, e.g., corresponding to a top left most position of the authentication image.

Still referring to FIG. 4, control next passes to block 430 where the authentication image can be displayed using the random coordinates. In an embodiment, this authentication image, which is part of the display frame image, can be thus overlaid over the background portion of the display frame image as a bitmap. Note that embodiments may provide a correction mechanism should the random coordinates cause the authentication image to be clipped (e.g., due to the authentication image extending beyond an edge of the display panel in either the X or Y coordinate axis). In another embodiment, a pre-computed set of random values that would cause the authentication image to exceed beyond the edge can be identified and removed from the available random coordinates.

Based on this display frame image, gesture input values can be received from a user (block 440). Note that the receipt of such gesture input values is by way of an untrusted channel, whether it be touchpad, touch screen, mouse or so forth. Next at block 450, the gesture input values can be adjusted according to the random coordinates. That is, the gesture input values, which can be in the form of X, Y coordinates at which the user provides the touch or other input, can be adjusted to accommodate for the random set of coordinates at which the authentication image is displayed. For example, assume that the authentication image has a top left most pixel with an X, Y location of [100, 200] corresponding to the random set of coordinates. To obtain the adjusted gesture input values, the received values can have these set of coordinates subtracted therefrom. In this example, the adjusted (normalized) gesture X'=X−100, Y'=Y−200. The normalized image starting location (0, 0) is obtained such that X:0=X−100 and Y:0=Y−200.

Still referring to FIG. 4, next control passes to block 460 where the adjusted gesture input values can be compared to the authentication gestures which were received during the provisioning process. Control next passes to diamond 470 where it can be determined whether the adjusted gesture input values match the authentication gestures. If so, control passes to block 480 where user access to the platform (or at least an agent on the platform subject to authentication) is allowed. Otherwise, control passes to block 490 where such access can be prevented.

Of course variations are possible. For example, rather than requiring exact matching of the adjusted gesture input values and the authentication gestures, it can be determined whether these values match within a predetermined threshold, to account for variability in the user input. Also, although multiple gesture input values and authentication gestures are described in this embodiment, in some implementations only a single gesture input value and a corresponding single authentication gesture may be present. In still other embodiments, varying numbers of such values and gestures can be present.

Furthermore, although a single authentication image and a single challenge is shown for ease of illustration in the embodiment of FIG. 4, understand the scope of the present invention is not limited in this regard and in other embodiments, a sequence of display frame images including different authentication images, each located at a random location within the display frame image can occur, with a user being authorized if the user successfully passes the challenge (e.g., as shown in FIG. 4) for at least a threshold number of these images. Thus in some embodiments, multiple lock screen images may be provided that are each randomly placed on the background one after the other. The sequence can also be randomly selected from one challenge session to the next. An attacker can log gestures, but cannot predict the X, Y coordinates of subsequent user login attempts so that any attack will be unsuccessful.

Embodiments thus may mitigate against a host malware attack, and operate under the assumption that the input path is untrusted. As such, the ME using any input method may receive tampered input. Host malware is capable of replaying any previously inputted value. Embodiments operate to detect host spoofing of the input by randomizing the (X,Y) location of the lock screen image overlaid on a larger background image. The malware can detect the pattern and sequence of inputs, but cannot predict exact (X, Y) coordinate of where the image is displayed within the field of the background image. If the attacker guesses (X, Y) staring coordinate incorrectly, the user authentication attempt fails.

The probability malware can guess the randomized (X, Y) coordinate is computed as:

$$P(X,Y)=P(X)P(Y); \text{where } P(X)=1/(h\text{-res background}-h\text{-res lock screen})P(Y)=1/(v\text{-res background}-v\text{-res lock screen}).$$

If h-res background=1024 and v-res background=768; and if h-res lockscreen=100 and v-res lockscreen=77; then $P(X,Y)=1/(1024-100)*1/(768-77)=1/924*1/691=1.57\times10-6$. By comparison, a password probability is computed by:

$$P(x)=(26-x)!/26!$$

Given a 8 digit password; $P(x)=(26-8)!/26!=4.43\times10-13$. Given a 6 digit password; $P(x)=(26-6)!/26!=2.30\times10-10$. Given a 4 digit password: $P(x)=(26-4)!/206!=1.43\times10-6$. Since the attacker is presumed to have logged the user inputted values, malware can exactly replicate these values given a correct (X,Y) coordinate guess.

Randomizing an (X,Y) coordinate for touch-based authentication as described herein improves security, and may be roughly equivalent to a 4-digit password. However, it may not be adequate security for a determined attacker.

Embodiments may thus also provide mitigation against an insider attack theory based on the difficulty another person can guess the legitimate user's chosen gestures. The strength of the mechanism is increased by adding additional distinct gestures or by changing sequence ordering. Gestures are described in two-dimensional (2D) space as beginning and ending touch points along a line. Lines can be straight, curved or simple geometric shapes. A point is a line where start and end are the same. A distinct gesture therefore is represented as a set of two points in a plane:

$$g0=(x1,y1),(x2,y2).$$

A gesture baseline is the sequence of distinct gestures:

$$G=g0,g1,g2,\ldots,gn.$$

The probability of guessing a distinct gesture is the probability of guessing two independent point in the X, Y plane.

$$P(g)=1/h\text{-res lockscreen}*1/v\text{-res lockscreen}.$$

The probability of guessing a sequence of gestures is given as:

$$P(G)=p(g0)*p(g1)*p(g2),\ldots,p(gn).$$

Using the example lock screen resolution above of 100× 77, the probability of guessing the gesture sequence can be theoretically computed assuming the user is capable of selecting exactly the same (X,Y) coordinates each touch event. For example, 5, 4, and 3 gestures respectively have theoretical maximum entropy as follows: $P(g)=1/100*1/77=1.30e-4$  $P(G5)=(1.30e-4)5=3.69e-20$  $P(G4)=(1.30e-4)4=2.84e-16$  $P(G3)=(1.30e-4)3=2.19e-12$. However, user touch precision is much less precise. Therefore a selection that is within 10 or 20 pixels may be accepted. Therefore, a field that represents margin of error may be incorporated into the probability calculation.

$$P(X,Y)=P(X)P(Y); \text{where } P(X)=1/(h\text{-res lockscreen}-h\text{-res margin})P(Y)=1/(v\text{-res lockscreen}-v\text{-res margin}).$$

Adjusting for margin of error: $P(g)=1/(100-20)*1/(77-20)=1/80*1/57=2.19e-4$  $P(G5)=(2.19e-4)5=5.07e-19$  $P(G4)=(2.19e-4)4=2.31e-15$  $P(G3)=(2.19e-4)3=1.05e-11$. Even with conservative margin for error, analysis suggests a simple gesture sequence of 3 or 4 gestures can sufficient to mitigate insider attacks.

Embodiments thus can harden an authentication mechanism that is easier to use than passwords, and can be implemented on hardware available on various systems. Still further, embodiments can be used in conjunction with other authentication and single-sign-on capabilities.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Figure 5:
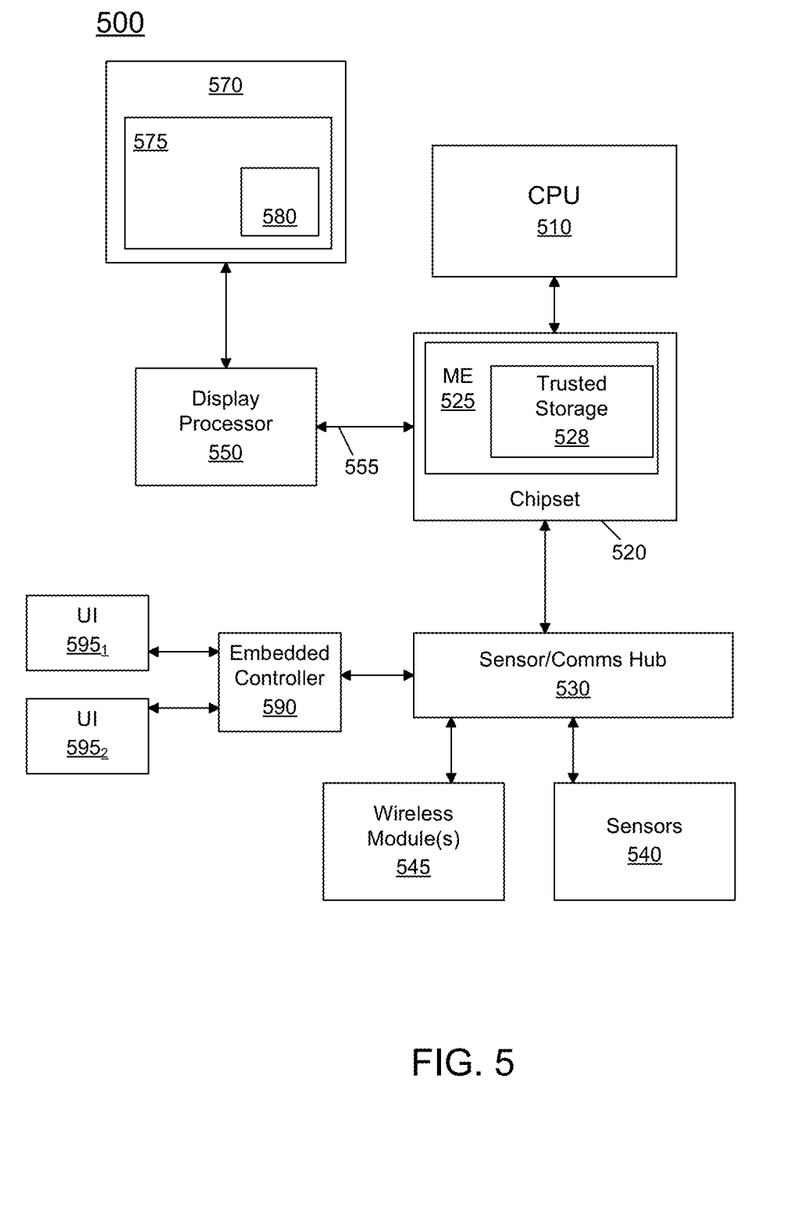
FIG. 5 is a block diagram of a system arrangement in accordance with another embodiment of the present invention.

Referring now to FIG. 5, shown is a block diagram of a system arrangement in accordance with an embodiment of the present invention illustrating a launch execution process. As seen in FIG. 5, system 500 may include a central processing unit (CPU) 510. In various embodiments, this CPU may be a SoC or other multicore processor and can include secure execution technologies such as Intel® TXT™ technology, Intel® Manageability Engine (ME), or an ARM TrustZone to enable a trusted execution environment. This environment establishes a root of trust that evaluates the computing platform, including measuring platform components in the boot and launch environment (such as BIOS, an operating system (OS) loader, virtual machine manager, and other components). This root also provides a trusted position to evaluate the integrity of any other component. Once a basic root of trust and a secure basis for measurement and evaluation is established, other mechanisms can be used to seal and protect secrets in memory, as well as provide local or remote attestation of system configuration.

As seen in the embodiment of FIG. 5, CPU 510 may be coupled to a chipset 520. Although shown as separate components in the embodiment of FIG. 5, understand that in some implementations chipset 520 may be implemented within the same package as CPU 510, particularly when the CPU is implemented as an SoC. As seen, chipset 520 may include a manageability engine 525 including a trusted storage 528 which can store one or more authentication images and corresponding authentication gestures such as described herein.

In the embodiment of FIG. 5, additional components may be present including a sensor/communications hub 530 which may be a standalone hub or configured within chipset 520. As seen, one or more sensors 540 may be in communication with hub 530. As examples for purposes of illustration, the sensors may include a GPS module or other such dedicated location sensor. Other sensors, such as inertial and environmental sensors may be present. Also, in various embodiments one or more wireless communication modules 545 may also be present to enable communication with local or wide area wireless networks such as a given cellular system in accordance with a 3G or 4G/LTE communication protocol.

As further seen in FIG. 5, platform 500 may further include a display processor 550 that can be coupled to ME 525 via a secure channel 555 to prevent snooping of display frame images (including randomly located authentication images) as described herein. As seen, display processor 550 may couple to a display 570 that can be a touch screen display to receive user input such as responses to an authentication challenge. Thus in this example, configured within the display may be a touch screen 575 and a touch screen controller 580 (which of course is hidden behind the display itself). Note that the input channels from these components to ME 525 may be an untrusted channel. Similarly, other user interfaces, namely user interfaces $595_1$ and $595_2$ which in an example can be a keyboard and a mouse, may be coupled via an embedded controller 590 to the sensor/communications hub 530. Again this input path from these user interfaces may be via an untrusted channel.

Figure 6:
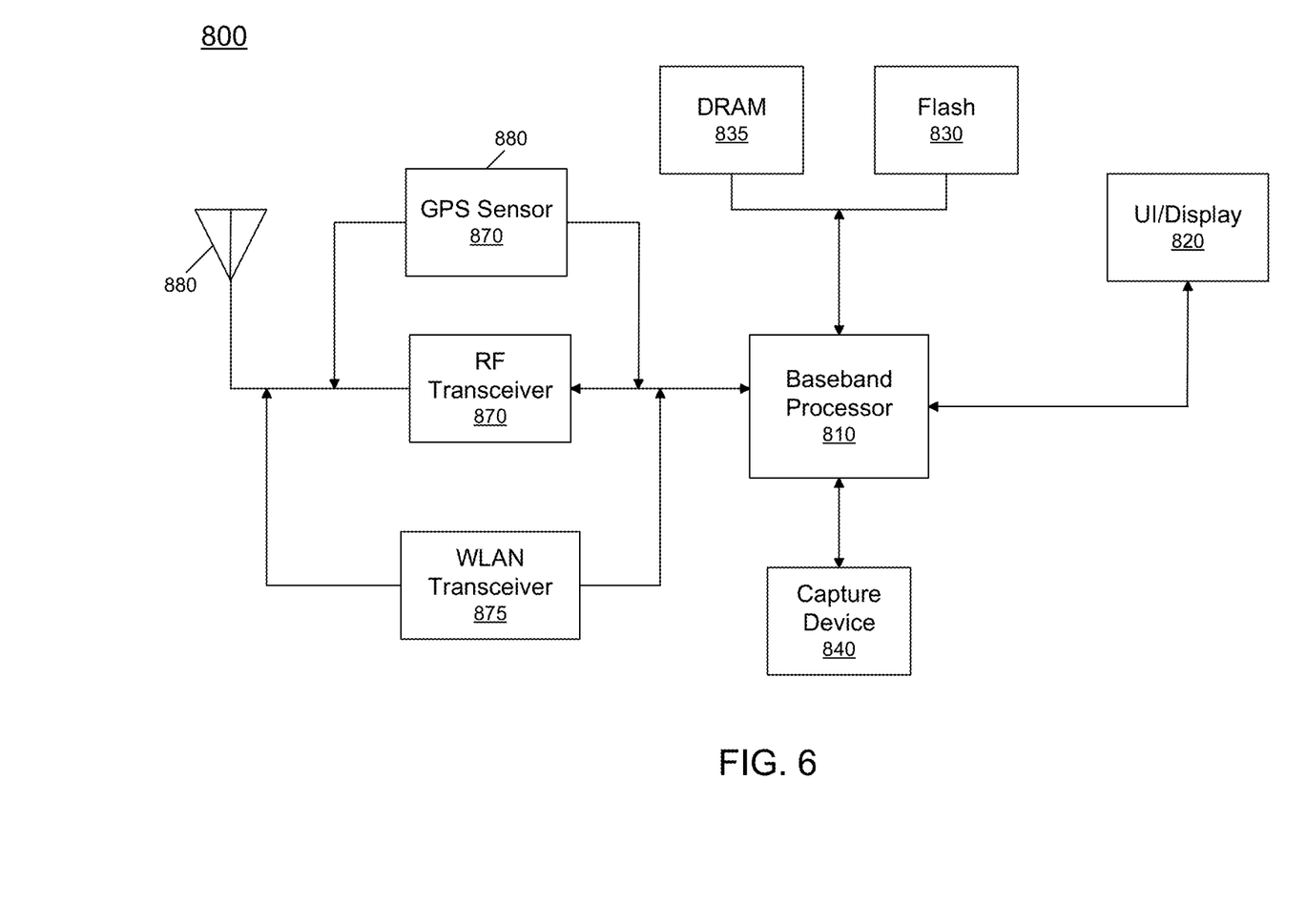
FIG. 6 is a block diagram of an example system with which embodiments can be used.

Embodiments can be used in many different environments. Referring now to FIG. 6, shown is a block diagram of an example system 800 with which embodiments can be used. As seen, system 800 may be a smartphone or other wireless communicator. As shown in the block diagram of FIG. 6, system 800 may include a baseband processor 810 which can include a security engine such as a manageability engine and other trusted hardware support to perform an image-based authentication before allowing a user to access a selected agent. In general, baseband processor 810 can perform various signal processing with regard to communications, as well as perform computing operations for the device. In turn, baseband processor 810 can couple to a user interface/display 820 which can be realized, in some embodiments by a touch screen display that can both provide an authentication image at a random location on the display and also receive user input gestures. In addition, baseband processor 810 may couple to a memory system including, in the embodiment of FIG. 6 a non-volatile memory, namely a flash memory 830 and a system memory, namely a dynamic random access memory (DRAM) 835. As further seen, baseband processor 810 can further couple to a capture device 840 such as an image capture device that can record video and/or still images.

To enable communications to be transmitted and received, various circuitry may be coupled between baseband processor 810 and an antenna 880. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present. Other wireless communications such as receipt or transmission of radio signals, e.g., AM/FM and other signals may also be provided. In addition, via WLAN transceiver 875, local wireless signals, such as according to a Bluetooth™ standard or an IEEE 802.11 standard such as IEEE 802.11a/b/g/n can also be realized. Although shown at this high level in the embodiment of FIG. 6, understand the scope of the present invention is not limited in this regard.

The following examples pertain to further embodiments. In one embodiment, a system may include a processor to execute instructions, a manageability engine coupled to the processor and to authenticate a user of the system, and a trusted storage associated with the manageability engine to store an authentication image and an authentication gesture associated with the authentication image. The manageability engine may cause a display of the authentication image within a portion of a display frame according to a set of random coordinates, receive a gesture input value from the user, and determine whether the user is authenticated based on the gesture input value and the authentication gesture. The manageability engine may adjust the gesture input value according to the set of random coordinates, e.g., by comparing the adjusted gesture input value to the authentication gesture.

The manageability engine may also authenticate the user and allow the user to access the system if the adjusted gesture input value is within a predetermined threshold of the authentication gesture, and otherwise not authenticate the user and prevent the user from access to the system. If the adjusted gesture input value does not match the authentication gesture within the predetermined threshold, the manageability engine may display a second authentication image within a portion of a second display frame according to a second set of random coordinates to enable the user to retry an authentication. In some embodiments, the manageability engine can sequentially display a plurality of authentication images each associated with a different set of random coordinates, and authenticate the user if at least a threshold number of gesture input values received from the user for a corresponding one of the authentication images matches a corresponding authentication gesture associated with the one of the plurality of authentication images.

The manageability engine may provide the display frame image to a display of the system via a trusted channel that is not accessible to an OS or an application executing on the system. Note that the system may create a secure channel with a remote system to receive the authentication image, and receive the authentication image via the secure channel responsive to a user selection of the authentication image.

In another embodiment, a method includes receiving a request for user authentication of a system in a security engine of the system; preparing a display frame image including an authentication image, where the display frame image is larger than the authentication image which is located with the display frame image using a set of random coordinates; displaying the display frame image on a display of the system; and receiving a plurality of gesture input values from the user, and determining whether to authenticate the user based at least in part on the plurality of gesture input values.

The method may include displaying the authentication image as a bitmap overlaid over the display frame image. This display frame image including the authentication image may be provided from the security engine to the display of the system via a trusted channel. The method may further include receiving the plurality of gesture input values in the security engine via an untrusted channel of the system.

In an embodiment, the method may include displaying a random sequence of authentication images, each using a corresponding set of random coordinates within the display frame image, and receiving a plurality of gesture input values from the user for each of the sequence of authentication images.

The method may also include authenticating the user if the plurality of gesture input values matches a stored set of authentication gestures associated with the authenticated image, within a predetermined threshold. Note that the stored set of authentication gestures may be received from the user during a security initialization procedure, in which the authentication image is located at an unrandomized set of coordinates. This stored set of authentication gestures may be stored in a trusted storage of the system.

In an embodiment, responsive to not authenticating the user for a first time, the display frame image may be re-displayed using a different set of random coordinates, and the method may also include receiving a second plurality of gesture input values from the user, and determining whether to authenticate the user based at least in part on the second plurality of gesture input values.

In another embodiment, at least one machine-readable storage medium includes instructions that when executed enable a system to create a secure channel with a remote system to receive an authentication image, prepare the authentication image according to a first set of coordinates for display of the authentication image on a display of the system to obtain at least one authentication gesture from a user viewing the authentication image and store the authentication image and the at least one authentication gesture associated with the authentication image in a trusted storage of the system. Note that in this embodiment, the authentication image is to be displayed on the display during an authorization challenge according to a different (e.g., random) set of coordinates.

The medium may further include instructions to display the authentication image within a portion of a display frame image according to the random set of coordinates, receive at least one gesture input value from the user, and determine whether the user is authenticated based on the at least one gesture input value and the at least one authentication gesture. The medium may further include instructions to adjust the at least one gesture input value according to the random set of coordinates and compare the at least one adjusted gesture input value to the at least one authentication gesture.

In another embodiment, a system includes processor means for executing instructions; security means for authenticating a user of the system; and storage means associated with the security means for storing an authentication image and at least one authentication gesture associated with the authentication image. The security means may be for displaying the authentication image within a portion of a display frame according to a set of random coordinates, receiving at least one gesture input value from the user, and determining whether the user is authenticated based on the at least one gesture input value and the at least one authentication gesture. In an embodiment, the security means may further be for adjusting the at least one gesture input value according to the set of random coordinates and comparing the at least one adjusted gesture input value to the at least one authentication gesture.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a display;
a processor to execute instructions;
a security processor coupled to the display via a trusted channel to authenticate a user of the system, the trusted channel inaccessible to an operating system of the system; and
a trusted storage coupled to the security processor to store an authentication image and at least one authentication gesture associated with the authentication image, wherein the security processor is to generate a display frame image having the authentication image included within a portion of the display frame image according to a set of random coordinates, provide the display frame image to the display via the trusted channel, receive at least one gesture input value from the user via an untrusted channel, and determine whether the user is authenticated based on the at least one gesture input value and the at least one authentication gesture.

2. The system of claim 1, wherein the security processor is to adjust the at least one gesture input value according to the set of random coordinates.

3. The system of claim 2, wherein the security processor is to compare the at least one adjusted gesture input value to the at least one authentication gesture.

4. The system of claim 3, wherein the security processor is to authenticate the user and allow the user to access the system if the at least one adjusted gesture input value is within a threshold of the at least one authentication gesture, and otherwise to not authenticate the user.

5. The system of claim 4, wherein if the at least one adjusted gesture input value is not within the threshold of the at least one authentication gesture, the security processor is to display a second authentication image within a portion of a second display frame image to be displayed on the display according to a second set of random coordinates to enable the user to retry an authentication.

6. The system of claim 1, wherein the security processor is to cause the display to sequentially display a plurality of authentication images each associated with a different set of random coordinates, and to authenticate the user if at least a threshold number of at least one gesture input value received from the user for a corresponding one of the plurality of authentication images matches a corresponding at least one authentication gesture associated with the one of the plurality of authentication images.

7. The system of claim 1, wherein the system is to create a secure channel with a remote system to receive the authentication image, and receive the authentication image via the secure channel responsive to a user selection of the authentication image.

8. The system of claim 1, wherein the display frame image comprises a lock screen image.

9. The system of claim 1, wherein the trusted channel is not visible to the operating system or an application to execute on the system.

10. At least one non-transitory machine-readable storage medium including instructions that when executed enable a system to perform a method comprising:
receiving, in a security engine of the system, a request for user authentication;
preparing, in the security engine, a display frame image including an authentication image, the display frame image larger than the authentication image and the authentication image having an anchor location identified by a set of random coordinates;
providing the display frame image including the authentication image within a portion of the display frame image from the security engine to a display of the system via a trusted channel for display of the display frame image on the display of the system, the trusted channel inaccessible to an operating system of the system; and
receiving a plurality of gesture input values from the user in the security engine via an untrusted channel of the system, and determining whether to authenticate the user based at least in part on the plurality of gesture input values.

11. The at least one non-transitory machine-readable storage medium of claim 10, further comprising instructions that when executed enable the computer to perform the method further comprising displaying the authentication image as a bitmap overlaid over the display frame image.

12. The at least one non-transitory machine-readable storage medium of claim 10, further comprising instructions that when executed enable the computer to perform the method further comprising displaying a sequence of authentication images, each having an anchor location identified by a corresponding set of random coordinates, and receiving a plurality of gesture input values from the user for each of the sequence of authentication images.

13. The at least one non-transitory machine-readable storage medium of claim 10, further comprising instructions that when executed enable the computer to perform the method further comprising authenticating the user if the plurality of gesture input values matches a stored set of authentication gestures associated with the authentication image, within a threshold.

14. The at least one non-transitory machine-readable storage medium of claim 13, further comprising instructions that when executed enable the computer to perform the method further comprising receiving the stored set of authentication gestures from the user during a security initialization procedure, in which the authentication image is located at an unrandomized set of coordinates.

15. The at least one non-transitory machine-readable storage medium of claim 14, further comprising instructions that when executed enable the computer to perform the method further comprising storing the stored set of authentication gestures in a trusted storage of the system.

16. The at least one non-transitory machine-readable storage medium of claim 10, further comprising instructions that when executed enable the computer to perform the method further comprising adjusting the plurality of gesture input values according to the set of random coordinates.

17. The at least one non-transitory machine-readable storage medium of claim 10, further comprising instructions that when executed enable the computer to perform the method further comprising, responsive to not authenticating the user for a first time, re-displaying the display frame image including the authentication image having a second anchor location identified by a second set of random coordinates, and receiving a second plurality of gesture input values from the user, and determining whether to authenticate the user based at least in part on the second plurality of gesture input values.

18. The at least one non-transitory machine-readable storage medium of claim 10, further comprising instructions that when executed enable the computer to perform the method, wherein the plurality of gesture input values are subject to access by malware executing on the system, and the authentication image within the display frame image is not subject to access by the malware.

19. A method comprising:
preparing, in a security engine of a system, an authentication image according to a first set of coordinates for display of the authentication image on a display of the system to obtain at least one authentication gesture from a user viewing the authentication image;
storing the authentication image and the at least one authentication gesture associated with the authentication image in a trusted storage of the system, wherein the authentication image is to be displayed on the display during an authorization challenge; and
generating, in the security engine of the system, a display frame image including the authentication image within a portion of the display frame image and anchored to a randomized set of coordinates within the display frame image, providing the display frame image via a trusted channel to the display of the system for display, the trusted channel inaccessible to an operating system of the system, receiving at least one gesture input value from the user based on the display frame image, and determining whether the user is authenticated based on the at least one gesture input value and the at least one authentication gesture.

20. The method of claim 19, further comprising adjusting the at least one gesture input value according to the randomized set of coordinates and comparing the at least one adjusted gesture input value to the at least one authentication gesture.

\* \* \* \* \*